United States Patent
Wu

(10) Patent No.: US 9,747,597 B2
(45) Date of Patent: Aug. 29, 2017

(54) MOBILE DEVICE AND AUTHENTICATION METHOD FOR MOBILE PAYMENT SYSTEM

(71) Applicant: Wistron Corporation, New Taipei (TW)

(72) Inventor: Tung-Ming Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 477 days.

(21) Appl. No.: 14/141,464

(22) Filed: Dec. 27, 2013

(65) Prior Publication Data

US 2015/0039507 A1 Feb. 5, 2015

(30) Foreign Application Priority Data

Jul. 31, 2013 (TW) .............................. 102127483 A

(51) Int. Cl.
*G06Q 20/00* (2012.01)
*G06Q 20/32* (2012.01)
*G06Q 20/40* (2012.01)

(52) U.S. Cl.
CPC ..... *G06Q 20/3227* (2013.01); *G06Q 20/3229* (2013.01); *G06Q 20/3278* (2013.01); *G06Q 20/409* (2013.01)

(58) Field of Classification Search
CPC ........... G06Q 20/3227; G06Q 20/3229; G06Q 20/3278; G06Q 20/409
See application file for complete search history.

(56) References Cited

U.S. PATENT DOCUMENTS

2004/0267667 A1* 12/2004 Ohara .................... G06Q 20/00
705/43
2008/0172317 A1 7/2008 Deibert
(Continued)

FOREIGN PATENT DOCUMENTS

| CN | 101809633 A | 8/2010 |
|---|---|---|
| TW | 507910 | 10/2002 |
| WO | 2012152079 A1 | 11/2012 |

OTHER PUBLICATIONS

Office action mailed on Jun. 4, 2015 for the Taiwan application No. 102127483, filing date: Jul. 31, 2013, p. 1 line 11-14, p. 2-5 and p. 6 line 1-3.

(Continued)

*Primary Examiner* — Rajesh Khattar
(74) *Attorney, Agent, or Firm* — Winston Hsu

(57) ABSTRACT

A mobile device is utilized for a mobile payment system. The mobile device includes an identity module for storing an identity data; a communication module for communicating with a client and receiving a start signal to generate a notification signal; a processing module for executing an application program to obtain an authentication information according to the notification signal and determining whether the authentication information is legal according to a checking information to generate a switching signal; and a switching module for determining whether to connect the communication module and the identity module according to the switching signal; wherein the communication module reads the identity data stored in the identity module to obtain an identity result according to a conduction of the switching module, and transmits the identity result to the client.

23 Claims, 5 Drawing Sheets

(56) References Cited

U.S. PATENT DOCUMENTS

2009/0065572 A1* 3/2009 Jain .................. G06K 19/07739
235/379
2009/0112768 A1 4/2009 Hammad
2009/0233579 A1 9/2009 Castell

OTHER PUBLICATIONS

Office action mailed on Nov. 17, 2015 for the Taiwan application No. 10217483, filing date: Jul. 31, 2013, p. 2 line 2-26, p. 3-5 and p. 6 line 1-20.
Office action mailed on Mar. 9, 2016 for the Taiwan application No. 102127483, filing date: Jul. 31, 2013, p. 3 line 3-26, p. 4-7 and p. 8 line 1.
Office action mailed/issued on Jan. 26, 2017 for CN application No. 201310351495.8, p. 3 line 5-30, pp. 4-5 and p. 6 line 1-29.

* cited by examiner

US 9,747,597 B2

MOBILE DEVICE AND AUTHENTICATION METHOD FOR MOBILE PAYMENT SYSTEM

BACKGROUND OF THE INVENTION

1. Field of the Invention

The present invention relates to a mobile device and an authentication method, and more particularly, to a mobile device and an authentication method capable of ensuring security of the mobile device utilized in a mobile payment system.

2. Description of the Prior Art

Recently non-cash transactions are more and more popular and various payment systems of e-commerce have been already developed, such as a credit card, a debit card, a stored money card, a digital wallet, an e-cash, a mobile payment system, an electronic check, or etc. On the other hand, with the rapid growth of mobile device markets (such as a smart phone), a mobile payment system of e-commerce for a user to perform a payment by the mobile device becomes one of the most popular topics.

In the mobile payment system, a user transmits an identity data to a client by the mobile device, such as transmitting a personal identification or bank information to the client. Then, the client transmits the identity data to a service (such as a bank, a credit center, or etc.) to confirm whether the identity data is correct and perform an authentication. When the service determines that the identity data is legal, the service performs a payment for consumption by the user to the client. As a result, a mobile electrical transaction is completed.

However, when the mobile device does not have any security mechanism for the mobile payment system, if the user loses the mobile device, any person may easily perform the electrical transaction by the lost mobile device, or a criminal client may secretly perform an abnormal electrical transaction with the mobile device rather than inform the user. These situations will cause the user great loss of money. Thus, how to ensure security of the mobile device utilized in the mobile payment system is an important problem for improvement.

SUMMARY OF THE INVENTION

It is therefore an objective of the present invention to provide a mobile device and an authentication method capable of ensuring security of the mobile device utilized in a mobile payment system by adding a security mechanism in the mobile device.

The present invention discloses a mobile device for a mobile payment system, wherein the mobile payment system comprises a client and a service. The mobile device comprises an identity module for storing an identity data generated by the service; a communication module for communicating with the client and receiving a start signal transmitted from the client to generate a notification signal; a processing module, coupled to the communication module, for executing an application program to obtain an authentication information according to the notification signal generated by the communication module or a manual start of a user, and determining whether the authentication information is legal according to a checking information to generate a switching signal; and a switching module, coupled to the processing module, the communication module, and the identity module, for determining whether to connect the communication module and the identity module according to the switching signal generated by the processing module; wherein the communication module reads the identity data stored in the identity module to obtain an identity result according to a conduction of the switching module and transmits the identity result to the client.

The present invention further discloses an authentication method for a mobile device in a mobile payment system, wherein the mobile payment system comprises a client and a service. The authentication method comprises communicating with the client by a communication module and receiving a start signal transmitted from the client to generate a notification signal; executing an application program to obtain an authentication information according to the notification signal or a manual start of a user, and determining whether the authentication information is legal according to a checking information to generate a switching signal; and determining whether to turn on a switching module to connect the communication module and an identity module storing an identity data generated by the service according to the switching signal; wherein the communication module reads the identity data stored in the identity module to obtain an identity result according to a conduction of the switching module and transmits the identity result to the client.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
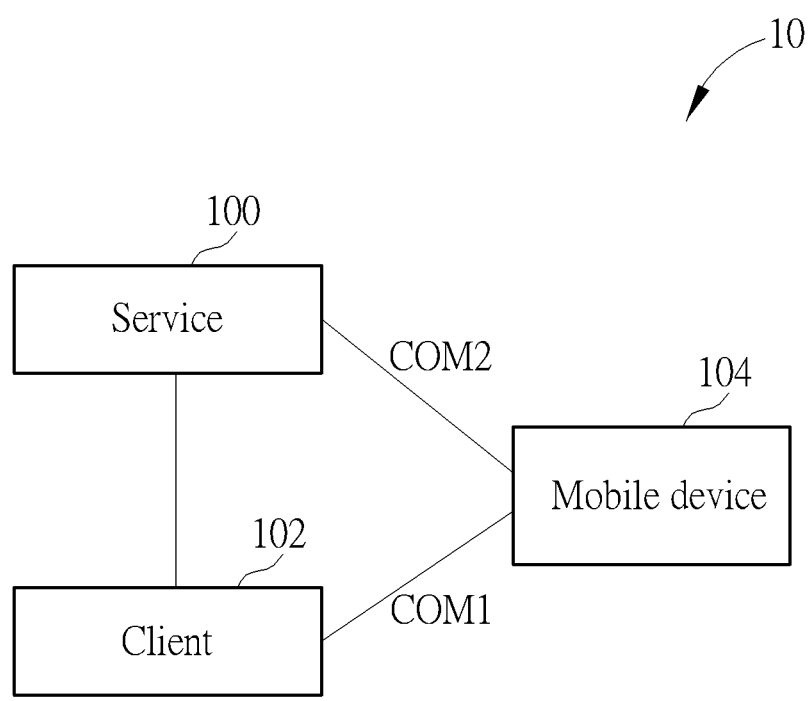
FIG. 1 is a schematic diagram of a mobile payment system according to an embodiment of the present invention.

FIG. 1 is a schematic diagram of a mobile payment 10 system according to an embodiment of the present invention. As shown in FIG. 1, the mobile payment system 10 includes a service 100, a client 102, and a mobile device 104. In the mobile payment system 10, a user may communicate with the client 102 by the mobile device 104 to perform an electrical transaction, such as a payment for consumption. In detail, the mobile device 104 stores an identity data corresponding to the user generated by the service 100. When the user performs the electrical transaction with the client 102 by the mobile device 104, the mobile device 104 first communicates with the client 102 through a communication media COM1, and after the mobile device 104 receives a start signal corresponding to the electrical transaction from the client 102, the mobile device 104 transmits the identity data to the client 102 through the communication media COM1. Then, the client 102 transmits the identity data to the service 100 to perform an authentication and a confirmation. The service 100, such as a bank, or a united credit card processing center, verifies whether the identity data is legal and determines whether the user may perform the electrical transaction. For example, the service 100 verifies whether the pre-encoded identity data may be correctly decoded, or determines whether a credit of the user is sufficient or a spending amount is reasonable, etc. After the service 100 performs the authentication and the confirmation, the service 100 may accordingly perform a payment for consumption by the user to the client 102 to finish the electrical transaction.

Additionally, when the mobile device 104 has a mobile communication capability, the mobile device 104 may also directly communicate with the service 100 through a communication media COM2 in the mobile payment system 10. Therefore, after the mobile device 104 receives the start signal from the client 102 through the communication media COM1, the mobile device 104 directly transmits the identity data to the service 100 through the communication media COM2. Then, after the service 100 verifies whether the identity data is legal and determines whether the user may perform the electrical transaction, the service 100 accordingly performs the payment for the consumption of the user to the client 102 to finish the electrical transaction.

Figure 2:
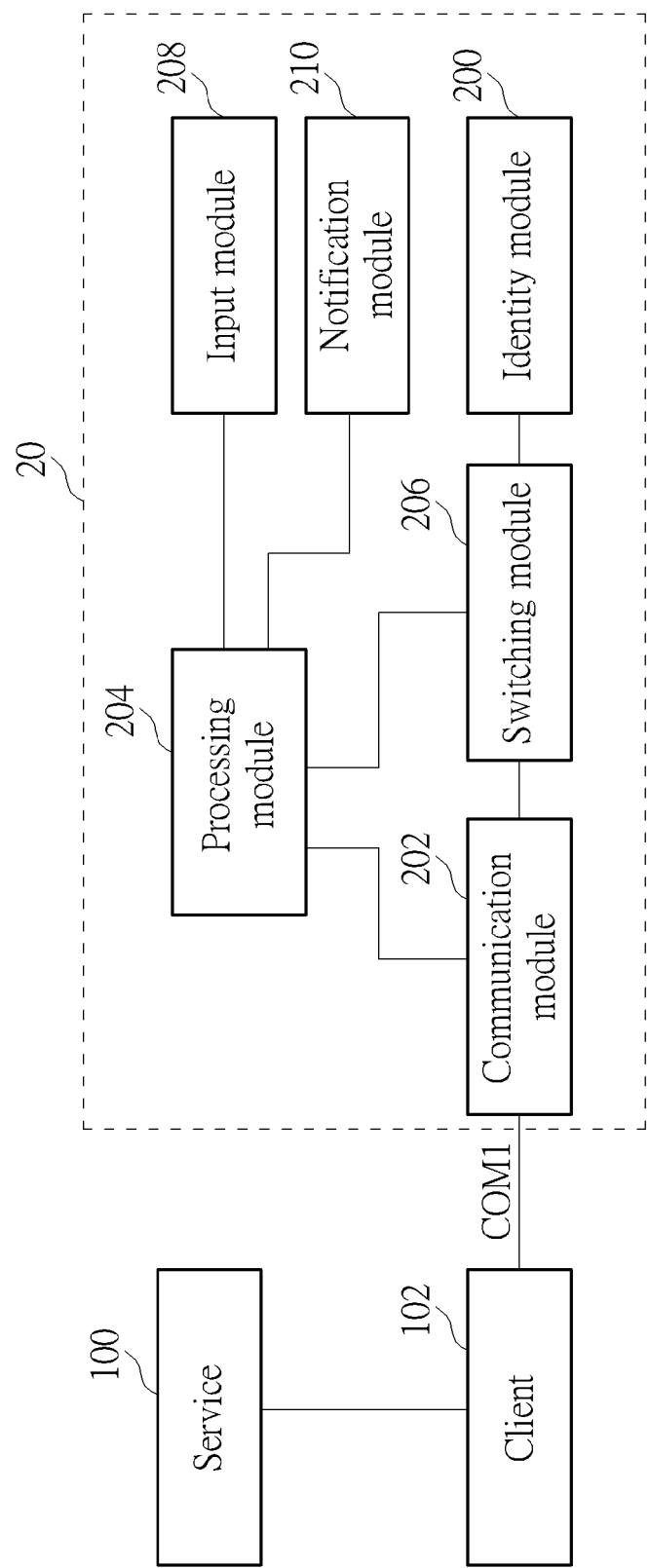
FIG. 2 is a schematic diagram of a mobile device according to an embodiment of the present invention.

Please refer to FIG. 2, which is a schematic diagram of a mobile device 20 according to an embodiment of the present invention. As shown in FIG. 2, the mobile device 2 includes an identity module 200, a communication module 202, a processing module 204, a switching module 206, an input module 208, and a notification module 210. The communication module 202, the switching module 206, the input module 208, and the notification module 210 are coupled to the processing module 204. The mobile device 20 is an embodiment of the mobile device 104 in the mobile payment system 10, and the mobile device 20 may be a smart phone, a tablet, or a notebook, etc.

The identity module 200 may be a rewritable flash ROM module, or a secure digital (SD) memory module, etc. The identity module 200 is embedded in the mobile device 20 or configured in a slot of the mobile device 20 for storing the identity data corresponding to the user generated by the service 100. The identity data is utilized for the authentication to perform the electrical transaction. In addition, the identity module 200 may also be an application-specific integrated circuit (ASIC) designed by the service 100 to be directly embedded in the mobile device 20.

The processing module 204 may be implemented by a single ASIC or by a processor combined with a storage device. The storage device stores a program code to indicate to the processor to perform processes. The storage device may be a read-only memory (ROM), a random-access memory (RAM), a CD-ROMs, a magnetic tape, a floppy disk, an optical data storage device, or etc, which is not limited hereinafter.

The communication module 202 is coupled to the processing module 204, receives control signals from the processing module 204, and transmits corresponding response signals to the processing module 204. Furthermore, the communication module 202 may communicate with the client 102, and in the embodiment, the communication module 202 may be a near field communication (NFC) module to communicate with another corresponding NFC module of the client 102 through the communication media COM1 according to an NFC standard. In addition, the communication module 202 may also be a Wi-Fi™ module or a Bluetooth module, etc, to communicate with the client 102 according to a Wi-Fi™ standard or a Bluetooth standard, and is not limited hereinafter.

The switching module 206 is coupled to the processing module 204, the communication module 202, and the identity module 200. The switching module 206 may include controlled switching components or transistors, and is controlled by the processing module 204 to decide whether to connect the communication module 202 and the identity module 200.

The input module 208 is coupled to the processing module 204. The input module 208 may receive a manual input of the user or capture a biological feature of the user to convert to an authentication information, and transmits the authentication information to the processing module 204. The input module 208 may be, inter alia, a wireless or wired keyboard, a touch screen, a writing panel, an image scanner, an iris sensor, a fingerprint sensor, a voice receiver. The notification module 210 is coupled to the processing module 204 and generates a message transmitted from the processing module 204 to notify the user. The notification module 210 may be a screen or a speaker, etc.

In detail, when the user performs the electrical transaction with the client 102 by the mobile device 20, the user utilizes the mobile device 20 to be close to the client 102 having the NFC capability to communicate with the client 102 according to the NFC standard. The communication module 202 may receive the start signal transmitted from the client 102 and generate a notification signal to notify the processing module 204. The processing module 204 executes the application program according to the notification signal transmitted from the communication module 202, and the processing module 204 controls the input module 208 to obtain the authentication information of the user. The authentication information may be a password manually inputted by the user through the wireless or wired keyboard, a specific line pattern or picture drawn by the user through the touch screen, a specific barcode or two-dimensional barcode scanned by the user through the image scanner, or etc. In addition, the authentication information may also be an iris of the user sensed by the iris sensor, a palm-print of the user, a fingerprint of the user sensed by the fingerprint sensor, a related biologic feature of the user, or etc, which can make different alterations accordingly.

Additionally, the user may also first execute the application program to notify the processing module 204 to obtain the authentication information of the user by the input module 208, and the user utilizes the mobile device 20 to be close to the client 102 to communicate with the client. Then, the communication module 202 receives the start signal transmitted from the client 102 and generates the notification signal to notify the processing module 204. Thereby, the operating sequence may be adjusted according to actual requirements and is not limited.

After the processing module 204 obtains the authentication information of the user according to the notification signal transmitted form the communication module 202, the processing module 204 determines whether the authentication information is complied with a checking information pre-stored by the user. When the authentication information is complied with the checking information, the electrical transaction performed by the user through the mobile device 20 is legal. The processing module 204 generates a switching signal to turn on the switching module 206 to connect the communication module 202 and the identity module 200, and the communication module 202 may read the identity data of the identity module 200. On the other hand, when processing module 204 determines the authentication information is not complied with the checking information, the electrical transaction performed by the user through the mobile device 20 is not legal or has errors. The processing module 204 generates the switching signal to turn off the switching module 206 to disconnect the communication module 202 and the identity module 200, and the processing module 204 may not read the identity data of the identity module 200.

Thereby, the identity data of the identity module 200 may be protected by the switching module 206 from being read by the communication module 202 and transmitted to the client 102. Furthermore, when the processing module 204 determines the authentication information is not compiled with the checking information, the processing module 204 may re-control the input module 208 to obtain the authentication information of the user. Similarly, the processing module 204 re-determines whether the authentication information is complied with the checking information until the authentication information is complied with the checking information, so as to turn on the switching module 206.

Specifically, the mobile device 20 determines whether authentication information inputted by the user is complied with the checking information to verify the electrical transaction performed by the user by the mobile device 20 is legal. When the electrical transaction is not legal or has the errors, the mobile device 20 notifies the user to re-input the authentication information. Furthermore, the switching module 206 is utilized in the mobile device 20 to disconnect the communication module 202 and the identity module 200 to protect the identity data from being transmitted to the client 102. As a result, when the user loses the mobile device 20, the protection mechanism in the mobile device 20 of the present invention may ensure security of the mobile device 20 utilized in the mobile payment system 10.

Notably, in addition to determining whether the electrical transaction performed by the user through the mobile device 20 is legal according to the authentication information, the mobile device 20 may further determine whether an occurrence number of the start signal transmitted from the client 102 is reasonable to notify the user whether the client 102 performs an abnormal transaction. In detail, when the occurrence number of the start signal transmitted from the client 102 is large, the communication module 202 may generate the notification signal multiple times to the processing module 204 according to the large occurrence number of the start signal. When the processing module 204 determines an occurrence number of the notification signal is greater than a predefine number within a predefined period, the processing module 204 controls the notification module 210 to notify the user that the client 102 performs the electrical transaction too many times. Thereby, before the processing module 204 obtains the authentication information of the user and determines whether the authentication information is legal, the processing module 204 may perceive whether the electrical transaction performed by the client 102 is reasonable, so as to enhance the security of the electrical transaction.

For example, when the user utilizes the mobile device 20 to be close to the client 102 and the processing module 204 determines the occurrence number of the notification signal generated by the communication module 202 is greater than one within 10 seconds, the processing module 204 may control a monitor to display a message showing that the client 102 performs the electrical transaction twice and an occurrence number of the electrical transaction is greater than one, so as to notify the user whether to give up this electrical transaction. Moreover, when the user does not utilize the mobile device 20 to be close to the client 102 and the processing module 204 determines the occurrence number of the notification signals generated by the communication module 202 is greater than one within 10 seconds, the processing module 204 similarly notifies the user to display a message showing that the client 102 performs an abnormal NFC communication with the mobile device 20.

Furthermore, after the communication module 202 receives the start signal transmitted from the client 102, the communication module 202 transmits the notification signal to notify the processing module 204 to determine whether the authentication information is complied with the checking information. Additionally, the communication module 202 reads the identity data of the identity module 200 to obtain an identity result after the processing module 204 performs the authentication, and then the communication module 202 transmits the identity result to the client 102. When an authentication result generated by the processing module 204 is legal, the switching module 206 may connect the communication module 202 and the identity module 200, and the identity result obtained by the communication module 202 is equal to the identity data of the identity module 200. When the client 102 transmits the identity result to the service 100, the service 100 determines the identity result is complied with the identity data and performs the payment of the electrical transaction to the client 102.

On the other hand, when the authentication result generated by the processing module 204 is not legal, the switching module 206 disconnects the communication module 202 and the identity module 200. The communication module 202 may not correctly read the identity data of the identity module 200, and the identity result obtained by the communication module 202 is not equal to the identity data. Thus, when the client 102 transmits the identity result to the service 100, the service 100 determines the identity result is not complied with the identity data and does not perform the payment of the electrical transaction to the client 102.

Noticeably, before the communication module 202 receives the start signal transmitted from the client 102, the switching module 206 of the mobile device 20 is turned off then to be controlled by the switching signal of the processing module 204. Additionally, when the user does not properly close the application program corresponding to the electrical transaction after the user performs the electrical transaction with the client 102 through the mobile device 20, the switching module 206 may always be turned on to cause the identity data to be read by the communication module 202. Thus, after the switching module 206 is turned on for a predefined period, the switching module 206 may further be turned off, and the security of the electrical transaction may be more enhanced.

In short, the mobile device 20 disconnects the communication module 202 and the identity module 200 by the switching module 206 when the authentication result is not legal to prevent the identity data from being transmitted to the client 102. Moreover, the mobile device 20 determines whether the occurrence number of the start signals transmitted by the client 102 is reasonable to notify the user whether the client 102 performs the abnormal electrical transaction or abnormal NFC communication. In addition, the mobile device 20 turns off the switching module 206 after the switching module 206 is turned on for the predefined period to prevent the identity data from being read, when the user does not properly close the application program. As a result, the electrical transaction performed by the mobile device 20 may have more security.

Figure 3:
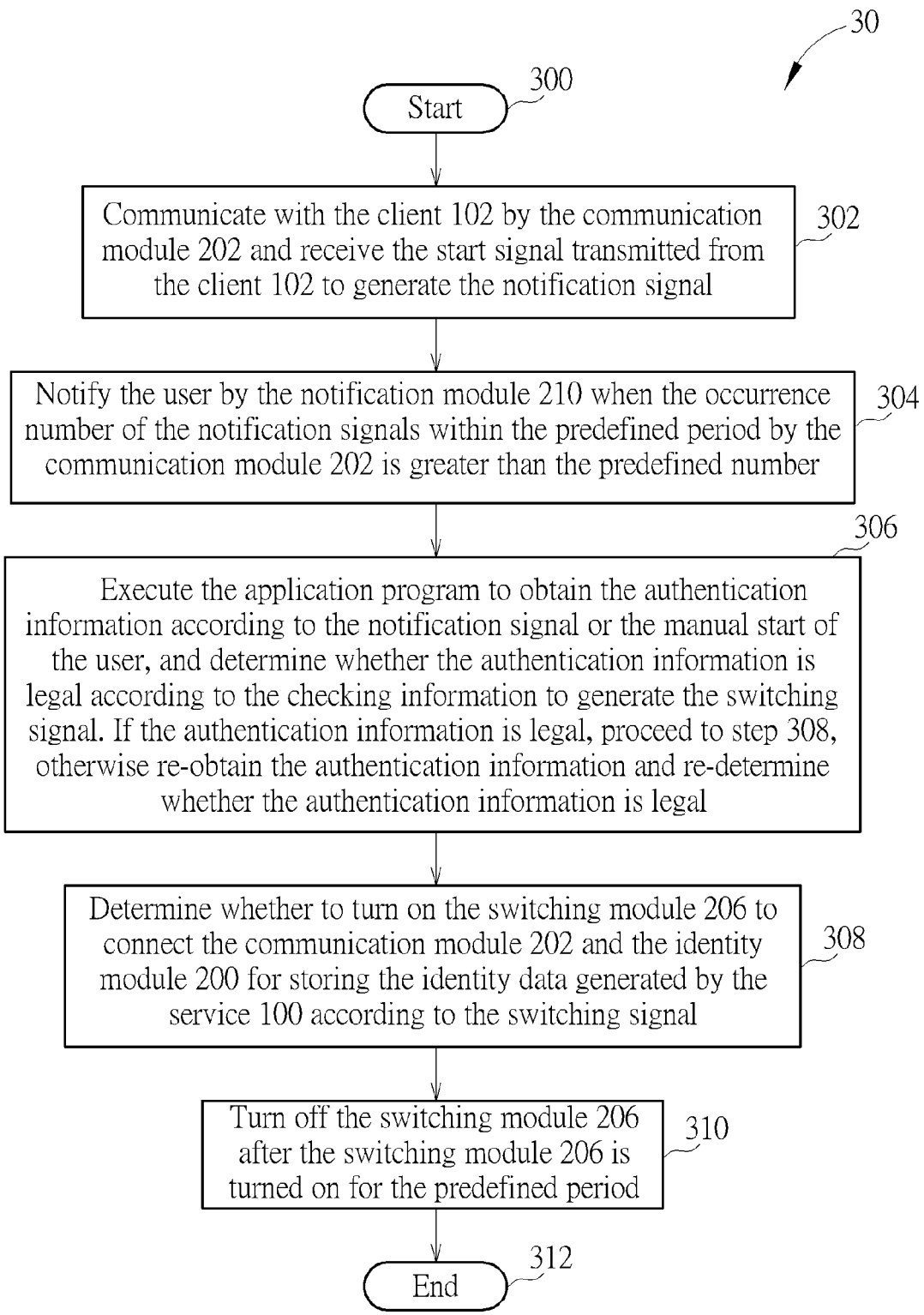
FIG. 3 is a schematic diagram of an authentication process according to an embodiment of the present invention.

The authentication method performed by the mobile device 20 may further be summarized as an authentication process 30 shown in FIG. 3. The authentication process 30 includes the following steps:

Step 300: start.

Step 302: communicate with the client 102 by the communication module 202 and receive the start signal transmitted from the client 102 to generate the notification signal.

Step 304: notify the user by the notification module 210 when the occurrence number of the notification signals within the predefined period by the communication module 202 is greater than the predefined number.

Step 306: execute the application program to obtain the authentication information according to the notification signal or the manual start of the user, and determine whether the authentication information is legal according to the checking information to generate the switching signal. If the authentication information is legal, proceed to step 308, otherwise re-obtain the authentication information and re-determine whether the authentication information is legal.

Step 308: determine whether to turn on the switching module 206 to connect the communication module 202 and the identity module 200 for storing the identity data generated by the service 100 according to the switching signal.

Step 310: turn off the switching module 206 after the switching module 206 is turned on for the predefined period.

Step 312: end.

The detailed operations of each step in the authentication process 30 may be referred to in the above embodiment and will not be narrated hereinafter. Preferably, the operating sequence of step 302 and step 306 may be adjusted according to the actual requirements. For example, step 306 may be first performed to execute the application program according to the manual start of the user and determine whether the authentication information is legal. Then, step 302 is performed to communicate with the client 102 by the communication module 202 and receive the start signal transmitted from the client 102 to generate the notification signal for performing the following step 304 and steps 308-310. These are all scopes of the present invention.

Furthermore, the authentication process 30 is utilized for performing the authentication of the mobile device 20 to ensure the security of the mobile device 20 performed by the user in the mobile payment system. Therefore, when the authentication result of the processing module 204 is not legal, the switching module 206 is configured for disconnecting the communication module 202 and the identity module 200, and the identity result obtained by the communication module 202 is not equal to the identity data. Under such a condition, the service 100 determines the identity result is not complied with the identity data, the service 100 may not perform the payment corresponding to the electrical transaction to the client 102.

Figure 4:
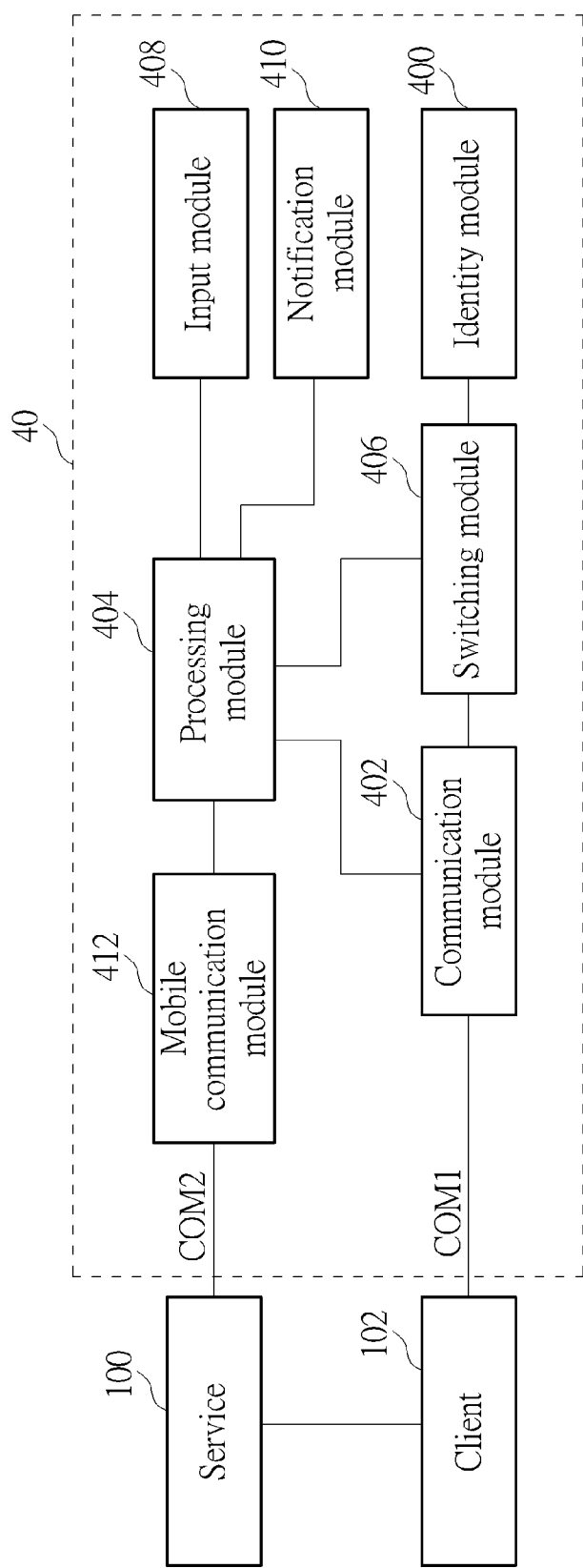
FIG. 4 is a schematic diagram of another mobile device according to an embodiment of the present invention.

In addition, please refer to FIG. 4, which is a schematic diagram of another mobile device 40 according to an embodiment of the present invention. As shown in FIG. 4, the mobile device 40 includes an identity module 400, a communication module 402, a processing module 404, a switching module 406, an input module 408, a notification module 410, and a mobile communication module 412. The mobile device 40 is an embodiment of the mobile device 104 in the mobile payment system 10, and the mobile device 40 may be a smart phone, a tablet, or etc. The connecting relationships of the identity module 400, the communication module 402, the processing module 404, the switching module 406, the input module 408, and the notification module 410 in the mobile device 40 are the same with the identity module 200, the communication module 202, the processing module 204, the switching module 206, the input module 208, and the notification module 210 in the mobile device 20, and may be referred to in the foregoing description, which will not be narrated hereinafter.

Comparing to the mobile device 20, the mobile device 40 further comprises the mobile communication module 412 to have the mobile communication capabilities, and the mobile device 40 may be utilized in the mobile communication system, such as a third generation mobile communication system, a fourth generation mobile communication system, or etc. Therefore, the mobile device 40 may communicate with the service 100 through the mobile communication media COM2. In addition to a rewritable flash ROM module, an ASIC module, or a secure digital (SD) memory module, the identity module 400 may be a subscriber identity module (SIM) of the mobile device 40 for storing an identity data required for the mobile communication and simultaneously storing the identity data required for the mobile payment.

Specifically, when the user performs the electrical transaction with the client 102 by the mobile device 40, the communication module 402 communicates with the client 102 to receive the start signal transmitted from the client 102 and generate the notification signal to notify the processing module 404. The processing module 404 performs the application program according to the notification signal to obtain the authentication information of the user by the input module 408. Then, the processing module 404 determines whether the authentication information is complied with the checking information pre-stored by the user. When the authentication information is complied with the checking information, the electrical transaction performed by the user through the mobile device 40 is legal. The processing module 404 generates the switching signal to turn on the switching module 406 to connect the communication module 402 and the identity module 400, and the communication module 402 may read the identity data of the identity module 400.

Noticeably, after the communication module 402 reads the identity data of the identity module 400 to obtain the identity result according to the conduction of the switching module 406, the communication module 402 transmits the identity result to the processing module 404, which is different from that the identity result is transmitted to the client 102 in the mobile device 20. Thereby, the processing module 404 transmits the identity result to the service 100 through the mobile communication module 412, and the service 100 may determine whether the identity result is complied with the identity data to accordingly perform the payment to the client 102.

Furthermore, when processing module 404 determines the authentication information is not complied with the checking information, the processing module 404 generates the switching signal to turn off the switching module 406, and the processing module 404 further transmits an error message to the service 100 or an email address by the mobile communication module 412, so as to notify the service 100 or a user of the email address that the authentication result corresponding to the electrical transaction has the errors. Thus, the security mechanism of the mobile device 40 may be more reliable.

Similarly, in addition to determine whether the electrical transaction performed by the user is legal according to the authentication information, the mobile device 40 may further determine whether the occurrence number of the start signal transmitted from the client 102 is reasonable to notify the user whether the client 102 performs the abnormal transaction. When the processing module 404 determines the occurrence number of the notification signals is greater than the predefine number within the predefined period, the processing module 404 control the notification module 410 to notify the user that the client 102 performs the electrical transaction too many times. Furthermore, the processing module 404 may also notify the service 100 or the user of the email address by the mobile communication module 412.

In short, the mobile device 40 determines whether the authentication information inputted by the user is complied with the checking information to verify whether the electrical transaction may be performed. When the authentication result is not legal or has the errors, the mobile device 40 notifies the user to re-input the authentication information and the mobile device 40 further disconnects the communication module 402 and the identity module 100 by the switching module 406, such that the processing module 404 may not obtain the correct identity data by the communication module 402 to transmit to the service 100. Moreover, the mobile device 40 may transmit the error message to the service 100 or the email address by the mobile communication module 412 to notify the service 100 and the user of the email address.

As a result, when the user loses the mobile device 40 or the client 102 performs the abnormal electrical transaction continuously, the identity data may be protected from being read by the authentication mechanism of the mobile device 40. Moreover, the mobile device 40 may notify the service 100 and the user of the email address, such that the mobile device 40 is more reliable and secure in the mobile payment system.

Figure 5:
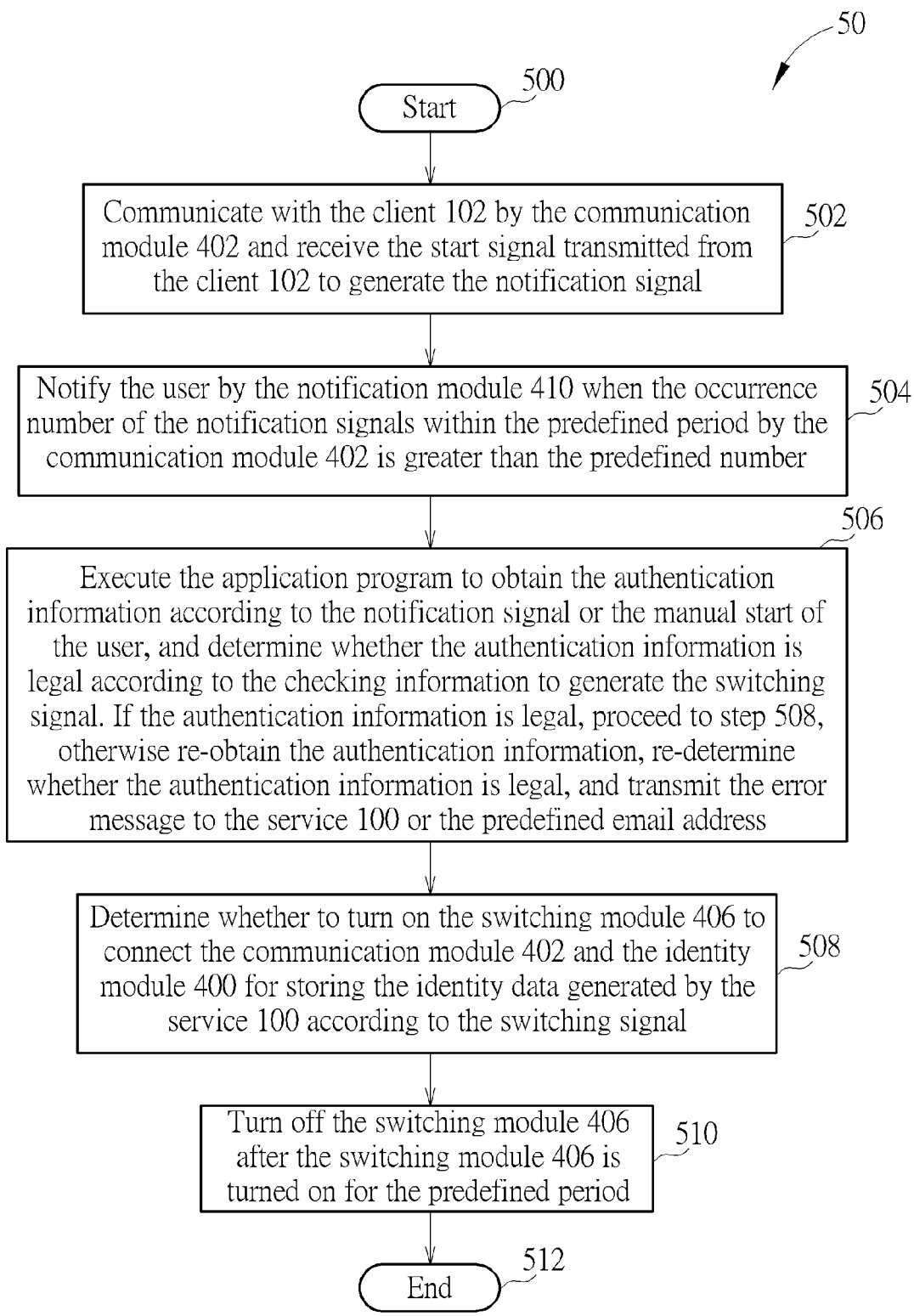
FIG. 5 is a schematic diagram of another authentication process according to an embodiment of the present invention.

The authentication method performed by the mobile device 40 may further be summarized as an authentication process 50 shown in FIG. 5. As shown in FIG. 5, the authentication process 50 includes the following steps:

Step 500: start.

Step 502: communicate with the client 102 by the communication module 402 and receive the start signal transmitted from the client 102 to generate the notification signal.

Step 504: notify the user by the notification module 410 when the occurrence number of the notification signals within the predefined period by the communication module 402 is greater than the predefined number.

Step 506: execute the application program to obtain the authentication information according to the notification signal or the manual start of the user, and determine whether the authentication information is legal according to the checking information to generate the switching signal. If the authentication information is legal, proceed to step 508, otherwise re-obtain the authentication information, re-determine whether the authentication information is legal, and transmit the error message to the service 100 or the predefined email address.

Step 508: determine whether to turn on the switching module 406 to connect the communication module 402 and the identity module 400 for storing the identity data generated by the service 100 according to the switching signal.

Step 510: turn off the switching module 406 after the switching module 406 is turned on for the predefined period.

Step 512: end.

The detailed operations of each step in the authentication process 50 may be referred to in the above embodiment and will not be narrated hereinafter. Preferably, the operating sequence of step 502 and step 506 may be adjusted according to the actual requirements. For example, step 506 may be first performed to execute the application program according to the manual start of the user and determine whether the authentication information is legal. Then, step 502 is performed to communicate with the client 102 by the communication module 402 and receive the start signal transmitted from the client 102 to generate the notification signal for performing the following step 504 and steps 508-510. These are all scopes of the present invention.

Furthermore, the authentication process 50 is utilized for performing the authentication of the mobile device 40 to ensure the security of the mobile device 40 performed by the user in the mobile payment system. Therefore, when the authentication result of the processing module 404 is not legal, the switching module 206 is configured for disconnecting the communication module 402 and the identity module 400, and the identity result obtained by the communication module 402 is not equal to the identity data. The processing module 404 transmits the identity result received from the communication module 402 to the service 100. Then, the service 100 determines the identity result is not complied with the identity data, and the service 100 may not perform the payment corresponding to the electrical transaction to the client 102.

Specifically, in the present invention, the security mechanism is added in the mobile device to determine whether the authentication information inputted by the user is compiled with the checking information, so as to ensure the security of the electrical transaction performed by the user through the mobile device. Those skilled in the art can make modifications or alterations accordingly. For example, in the embodiment, the switching module is configured for controlling whether to connect the communication module and the identity module according to the authentication result, such that the identity data stored in the identity module may be secure and not arbitrary read. In other embodiment, the identity module may also be controlled by a reading mechanism according to the authentication result to protect the identity data of the identity module from being read, which can make different alterations accordingly.

Moreover, in the embodiment, the authentication information of the user is obtained to determine whether to be complied with the checking information for verifying whether the electrical transaction performed by the user through the mobile device is legal. In addition to the password, the specific line pattern, the specific picture, the specific barcode, the iris, the palm-print, or the fingerprint, the authentication information may also be a voice, which may be recognized whether to be complied with a pre-stored voice by a recognizing hardware or software. Moreover, the authentication information may also be a specific gesture obtained by the touch screen, and the gesture is determined whether to be complied with a predefine check gesture. Various applications can be made accordingly and are not limited.

In summary, if the mobile device does not have any security mechanism, the person may easily perform the electrical transaction by the mobile device to cause the user great loss of money. In the present invention, the security mechanism is added in the mobile device. The user is required to input the authentication information complied with the checking information, and then the identity data may be read through the conducted switching module to transmit to the service for performing the electrical transaction. Thus, the security of the mobile device utilized in the mobile payment system may be more ensured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile device for a mobile payment system, wherein the mobile payment system comprises a client and a service, the mobile device comprising:
an identity module for storing an identity data generated by the service;
a communication module for communicating with the client and receiving a start signal transmitted from the client;
a switching module, coupled between the identity module and the communication module, controlled to conduct or disconnect a connection between the identity module and the communication module according to a switching signal; and
a processing module, coupled to the switching module, configured to generate the switching signal according to whether an authentication information inputted by a user is correct;
wherein the processing module determines that the authentication information is correct when the authentication information is complied with a checking information previously stored in the mobile device;
wherein when the processing module determines that the authentication information is correct, the processing module generates the switching signal to indicate to the switching module to conduct the connection between the identity module and the communication module, and the communication module is able to read the identity data stored in the identity module and transmit an identity result corresponding to the identity data to the client;
wherein when the processing module determines that the authentication information is incorrect, the switching module disconnects the connection between the identity module and the communication module;
wherein the switching module comprises a switch component or a transistor.

2. The mobile device of claim 1, wherein the identity module is a subscriber identity module (SIM), a rewritable flash ROM module, or a secure digital (SD) memory module.

3. The mobile device of claim 1, wherein the communication module is a near field communication (NFC) module, and the client comprises another near field communication (NFC) module corresponding to the near field communication (NFC) module for communicating with the mobile device.

4. The mobile device of claim 1, wherein the processing module comprises a processor and a storage device storing a program code to indicate to the processor to perform a process.

5. The mobile device of claim 1, wherein the mobile device further comprises an input module coupled to the processing module, and the processing module executes the application program to obtain the authentication information by the input module receiving a manual input of the user or by the input module capturing a biological feature of the user.

6. The mobile device of claim 1, wherein the communication module generates a notification signal when the communication module receives the start signal, the mobile device further comprises a notification module coupled to the processing module, and when the processing module determines an occurrence number of the notification signal within a predefined period is greater than a predefined number, the processing module notifies the user by the notification module.

7. The mobile device of claim 1, wherein the switching module is turned on to connect the communication module and the identity module according to the switching signal indicating that the authentication information is legal.

8. The mobile device of claim 7, wherein after the switching module is turned on for a predefined period, the switching module is turned off.

9. The mobile device of claim 7, wherein the switching module is turned off disconnecting the communication module and the identity module according to the switching signal indicating that the authentication information is not legal.

10. The mobile device of claim 1, wherein the client transmits the identity result received from the communication module to the service, and when the service determines the identity result is complied with the identity data, the service performs a payment to the client.

11. The mobile device of claim 1, wherein the mobile device further comprises a mobile communication module for communicating with the service, the processing module transmits the identity result received from the communication module to the service by the mobile communication module, and when the service determines the identity result is complied with the identity data, the service performs a payment to the client.

12. The mobile device of claim 11, wherein when the processing module determines the authentication information is not legal according to the checking information, the processing module transmits an error message to the service or a predefined email address by the mobile communication module.

13. An authentication method, applied for a mobile device in a mobile payment system, wherein the mobile payment system comprises a client and a service, the authentication method comprising following steps executed by the mobile device:
receiving a start signal transmitted from the client;
obtaining an authentication information inputted by a user;
determining whether the authentication information is correct;
generating a switching signal according to whether the authentication information is correct;
conducting a switching module coupled between a communication module and an identity module of the mobile device according to the switching signal when the authentication information is correct, wherein an identity data generated by the service is stored in the identity module; and
transmitting an identity result corresponding to the identity data to the client;
wherein the mobile device determines that the authentication information is correct when the authentication information is complied with a checking information previously stored in the mobile device;
wherein when the mobile device determines that the authentication information is correct, the switching signal indicates to the switching module to be conducted, and then the communication module reads the identity data stored in the identity module to obtain the identity result;
wherein when the mobile device determines that the authentication information is incorrect, the switching module disconnects the connection between the identity module and the communication module;
wherein the switching module comprises a switch component or a transistor.

14. The authentication method of claim 13, wherein the identity module is a subscriber identity module (SIM), a rewritable flash ROM module, or a secure digital (SD) memory module.

15. The authentication method of claim 13, wherein the communication module is a near field communication (NFC) module, and the client comprises another near field communication (NFC) module corresponding to the near field communication (NFC) module for communicating with the mobile device.

16. The authentication method of claim 13, further comprising obtaining the authentication information by an input module receiving a manual input of the user or by the input module capturing a biological feature of the user.

17. The authentication method of claim 13, further comprising:
notifying the user by a notification module when determining an occurrence number of a notification signal within a predefined period is greater than a predefined number;
wherein the notification signal is generated by the communication module when the communication module receives the start signal.

18. The authentication method of claim 13, further comprising turning on the switching module to connect the communication module and the identity module according to the switching signal indicating that the authentication information is legal.

19. The authentication method of claim 18, further comprising after the switching module is turned on for a predefined period, turning off the switching module.

20. The authentication method of claim 18, further comprising turning off the switching module to disconnect the communication module from the identity module according to the switching signal indicating that the authentication information is not legal.

21. The authentication method of claim 13, further comprising the client transmitting the identity result received from the communication module to the service, and when the service determines the identity result is complied with the identity data, the service performing a payment to the client.

22. The authentication method of claim 13, further comprising:
communicating with the service; and
transmitting the identity result to the service;
wherein when the service determines the identity result is complied with the identity data, the service perform a payment to the client.

23. The authentication method of claim 22, further comprising:
transmitting an error message to the service or a predefined email address when determining the authentication information is not legal according to the checking information.

\* \* \* \* \*